United States Patent
Varillon et al.

(10) Patent No.: US 12,411,244 B2
(45) Date of Patent: Sep. 9, 2025

(54) TIME OF FLIGHT SENSING

(71) Applicant: STMicroelectronics, Inc., Coppell, TX (US)

(72) Inventors: Paul Varillon, Ben Lomond, CA (US); Sivakumar Kandappan Singaravadivelu, Fremont, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 414 days.

(21) Appl. No.: 17/876,341

(22) Filed: Jul. 28, 2022

(65) Prior Publication Data

US 2024/0036208 A1 Feb. 1, 2024

(51) Int. Cl.
*G01S 17/894* (2020.01)
*G01S 7/4865* (2020.01)
*G01S 17/10* (2020.01)
*G01S 17/46* (2006.01)

(52) U.S. Cl.
CPC .......... *G01S 17/894* (2020.01); *G01S 7/4865* (2013.01); *G01S 17/10* (2013.01); *G01S 17/46* (2013.01)

(58) Field of Classification Search
CPC ...... G01S 17/894; G01S 7/4865; G01S 17/10; G01S 17/46
See application file for complete search history.

(56) References Cited

U.S. PATENT DOCUMENTS

| | | | |
|---|---|---|---|
| 7,190,832 B2 * | 3/2007 | Frost | G01N 15/1433 382/173 |
| 11,209,310 B2 * | 12/2021 | Mellot | G01J 1/44 |
| 11,222,305 B1 * | 1/2022 | Clayton | G06Q 10/087 |
| 2019/0033448 A1 * | 1/2019 | Molnar | G01S 7/4816 |
| 2020/0057151 A1 | 2/2020 | Finkelstein et al. | |
| 2020/0158876 A1 * | 5/2020 | Karadeniz | G01S 7/4808 |
| 2020/0284883 A1 * | 9/2020 | Ferreira | G01S 17/10 |
| 2021/0080576 A1 * | 3/2021 | Moore | G01S 17/26 |
| 2021/0096225 A1 * | 4/2021 | Subasingha | G01S 17/10 |
| 2021/0096263 A1 * | 4/2021 | Subasingha | G01S 17/931 |
| 2022/0070436 A1 * | 3/2022 | Van Nieuwenhove | H04N 13/25 |

FOREIGN PATENT DOCUMENTS

| | | | | |
|---|---|---|---|---|
| CN | 102339465 A | * | 2/2012 | |
| WO | WO-2021067136 A1 | * | 4/2021 | ............. G01S 17/10 |
| WO | WO-2022096585 A1 | * | 5/2022 | ............. G01S 17/894 |

OTHER PUBLICATIONS

Payne, et al., "Multiple Frequency Range Imaging To Remove Measurement Ambiguity," Dec. 31, 2008, provided by Research Commons, 10 pages.

(Continued)

*Primary Examiner* — Lisa M Caputo
*Assistant Examiner* — Nyla Gavia
(74) *Attorney, Agent, or Firm* — Slater Matsil, LLP

(57) ABSTRACT

An embodiment method for operating a device includes determining, based on data collected by a first sensor, first information between the first sensor and an object; determining, based on data collected by a second sensor, second information between the second sensor and the object; and determining a distance between the device and the object based on comparing the first information and the second information.

20 Claims, 10 Drawing Sheets

(56) References Cited

OTHER PUBLICATIONS

Li, Larry, "Time-of-Flight Camera An Introduction," Texas Instruments, Technical White Paper, SLOA190B—Jan. 2014, Revised May 2014, 10 pages.

Slattery, Colm et al., "ADI ToF Depth Sensing Technology: New and Emerging Applications inIndustrial, Automotive Markets, and More," Analog Dialogue, Nov. 2019, 21 pages.

STMicroelectronics, "Low-noise, low-power 0.54 Mpix, 3D iToF sensor die with 200 MHz modulation," VD55H1, Revision 2, Jan. 2022, 6 pages.

\* cited by examiner

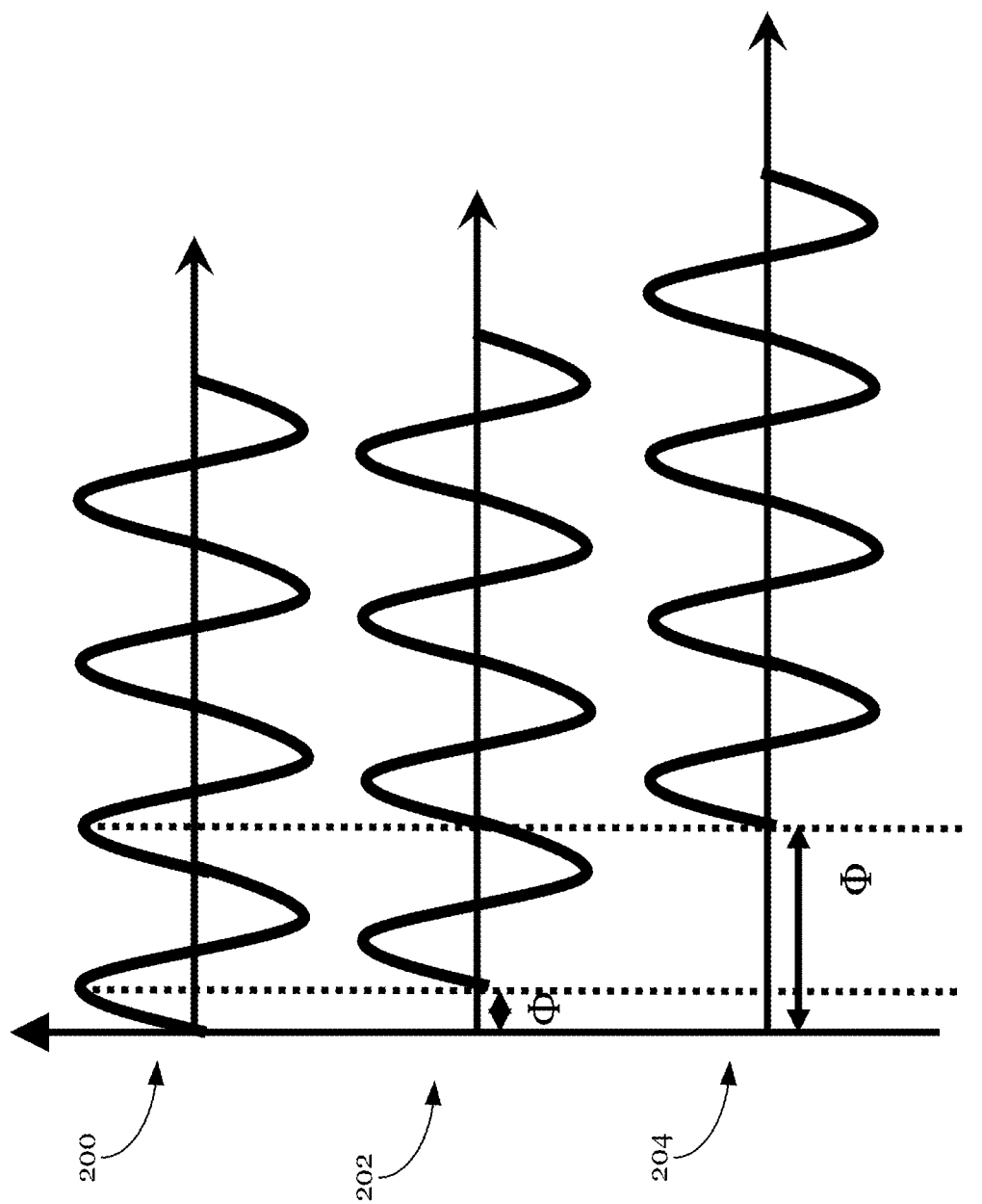

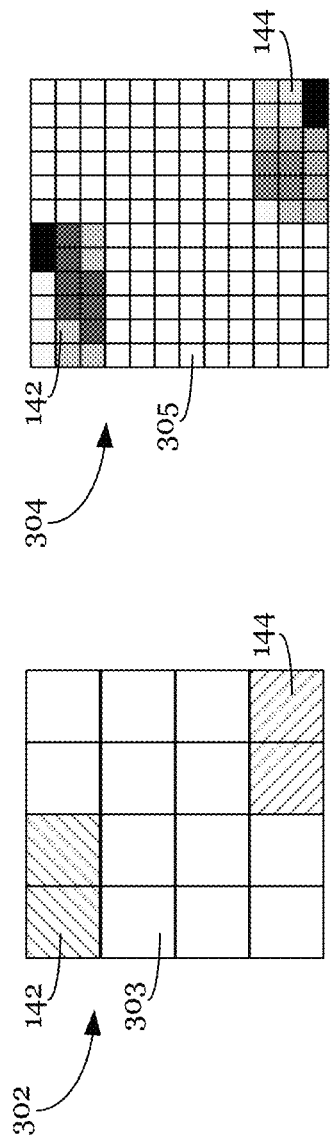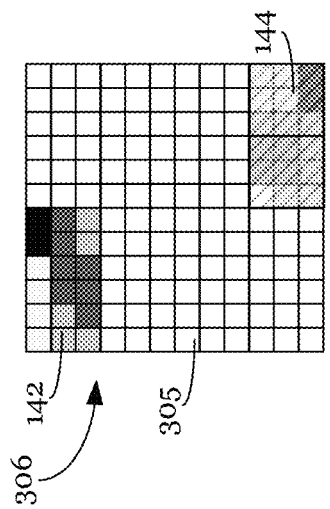

TIME OF FLIGHT SENSING

TECHNICAL FIELD

The present invention relates generally to a system and method for time of flight (ToF) sensing, and, to a system and method for extending the depth of indirect ToF (iToF).

BACKGROUND

The ability of time-of-flight (ToF) sensors to provide precise photon arrival times makes them popular candidates for depth map sensors. Such ToF sensors generally comprise a laser source such as a vertical cavity surface-emitting laser (VCSEL) that emits optical pulses or an optical waveform, and a photosensor that receives signals reflected off the target objects.

There are two different types of ToF sensing, direct ToF (dToF) sensing and indirect ToF (iToF) sensing. In the case of dToF sensing, a dToF system may emit a light pulse and measure the time that elapses between emission of the signal and the return of a reflected signal off the target object. Then the elapsed time (the time of flight) can be converted into a distance measurement.

In the case of iToF sensing, a modulated signal may be emitted from an iToF system. The returned signal is sensed by the pixels of the sensor. The phase of the returned signal reflected off the target object and the phase of the emitted signal may be compared to estimate the phase difference at each pixel.

Current technology does not allow a high spatial resolution depth map to be produced using dToF due to cost, size, and power constraints. On the contrary, iToF is suited to provide relatively high-resolution depth maps.

However, the iToF sensors are limited in not being able to determine a single distance to an object in a single scan and typically require multiple scans at different frequencies causing higher significant processing/power consumption/acquisition time. Therefore there is a need in the art for a ranging device and method that can produce high resolution depth maps with an increased range without compromising the above mentioned tradeoffs.

SUMMARY

A method for operating a device includes determining, based on data collected by a first sensor, first information between the first sensor and an object; determining, based on data collected by a second sensor, second information between the second sensor and the object; and determining a distance between the device and the object based on comparing the first information and the second information.

A device includes a first sensor attached to the device; a second sensor attached to the device; a controller; and a non-transitory memory storing a program to be executed in the controller, the program including instructions when executed cause the controller to: determine, based on data collected by a first sensor, a first information for a field of view of the first sensor, determine, based on data collected by a second sensor, a second information for a field of view of the second sensor, and determine a distance between the device and a plurality of objects based on comparing the first information with the second information.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates a component schematic of the device, FIG. 1B illustrates a component schematic of a direct time of flight (dToF) system, FIG. 1C illustrates a component schematic of an indirect time of flight (iToF) system, and FIG. 1D illustrates the device measuring the distance between the device and two different target objects by combining dToF and iToF FIG. 2 illustrates graphical representations for determining a distance between an indirect time of flight (iToF) sensor and two target objects;

FIGS. 3A-3I illustrate schematic diagrams for combining distances, ambient, amplitude, histogram, confidence information between an indirect time of flight (iToF) sensor and a direct time of flight (dToF) sensor to determine the distance between a device and the target objects, where FIG. 3A illustrates a dToF depth map, FIG. 3B illustrates histogram of the depth data from dToF sensor, 3C illustrates the ambient data from dToF sensor, 3D illustrates the amplitude data from the dToF sensor, 3E illustrates the iToF depth map, and FIG. 3F illustrates ambient data from the iToF data, 3G illustrates the amplitude data from the iToF sensor, 3H illustrates the confidence map from the iToF, and 3I illustrates a combined depth map generated by combining the dToF and the iToF information mentioned above;

DETAILED DESCRIPTION OF ILLUSTRATIVE EMBODIMENTS

Figure 1A:
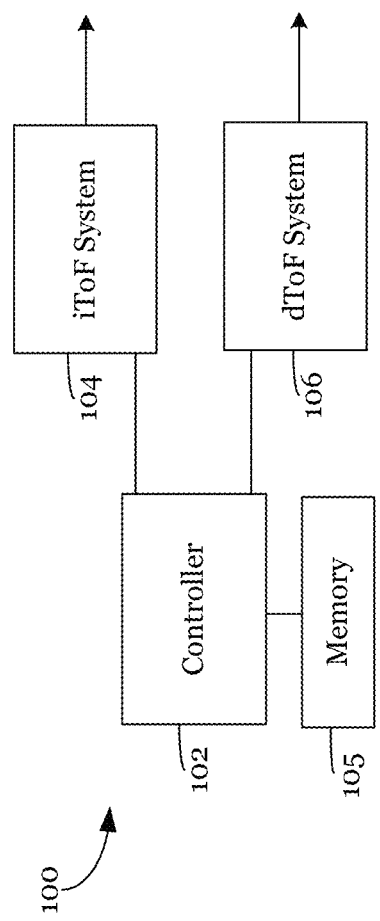
FIGS. 1A-1D illustrate schematic diagrams of a device according to an embodiment of the present application, where

Generally, time of flight (ToF) sensing can be direct time of flight sensing (dToF) or indirect time of flight sensing (iToF). dToF sensing relies on measuring the distance between the sensor and object by directly measuring the time required for a light beam to traverse the path between the sensor and the object. In contrast, iToF sensing as the name implies utilize an indirect method to measure the travel time for the light to travel between the sensor and object.

A dToF system generally includes a light source, a dToF sensor made of one or more single photon avalanche diodes (SPADs), a time to digital converter (TDC), and a processor. During normal operation, the light source, such as a vertical cavity surface-emitting laser (VCSEL) or a light emitting diode (LED), may emit a light pulse towards an object. Light pulses that reflect off the object (reflected light pulses) are sensed by a single or plurality of zones formed by the array of SPADs. The one or more SPADs collect data corresponding to the time that elapses between emission of the light pulse and the receipt of the reflected light pulses. The data collected by the SPADs is routed to the TDC. The TDC generates digital representations of data. The TDC transmits the digital representations to the processor which converts the digital representations of data into distance measurements. Based on the distance measurements, the processor may generate an information map such as depth map including an image of the object along with the distances between each zone and the object, histogram representation of the depth acquired, ambient data representing background light levels and amplitude data representing the light reflected off the targets. The generated information may from a single photodetector, single zone, or multiple zones, for example.

However, dToF systems come with their own sets of disadvantages. dToF systems provide a lower spatial resolution than iToF sensors (discussed below). dToF systems are best used for determining a small number of objects or a single object due to their increased cost.

An iToF system generally includes a light emitting source, an iToF sensor, readout circuitry, and a processor. In the case of iToF, a light source, such as a vertical cavity surface-emitting laser (VCSEL) or light emitting diode (LED), may emit a modulated signal towards an object. iToF sensors emit modulated light that has a set frequency and in phase with the receiver part of the iToF system.

The signal reflected off the object is received by the iToF sensor. The iToF sensor may be a camera including pixels formed by CMOS sensors or SPAD or other technologies. The modulated reflected signals sensed by the pixels may be transmitted to the readout circuitry. The readout circuitry may include an analog-to-digital converter (ADC), a digital signal processor (DSP), and a phase shift comparator. The readout circuitry may convert the signals received by the iToF sensor to digital data, determine the phase shifts (the phase differences) between the modulated reflected signals received by the pixels and the emitted modulated signal, and transmit the phase shifts to the processor. The processor may convert the phase shifts sensed by each pixel into distance measurements and may form a depth map comprising an image of the object with depth information including the distances between the pixels and the object. The processor also receives data from pixels that can be used to construct the ambient, and/or amplitude maps.

iToF sensors detect phase difference using a pulse-based or continuous-wave method. In the continuous-wave method, the modulated signal may be a continuous wave signal such as a sine wave signal, a square wave signal, whereas a pulse-based signal (i.e., a pulse train) is used in the pulse-based method. When a continuous wave signal is emitted as a periodic modulated signal, the phase shift can be directly obtained, e.g., by homodyne demodulation of the received reflected signal. In contrast, when a pulse-based signal is emitted, the light source emits a series of short light pulses, and the reflected light is sampled at every pixel in parallel using, e.g., two out of phase temporal windows having the same time duration.

Embodiments discussed in this application may be applied to either pulse-based or continuous-wave method. One advantage of this is that depth maps generated by the iToF system have a higher spatial resolution due to the large quantity of pixels. iToF sensors may be a more efficient solution for complex 3D imaging.

However, iToF comes with its own set of disadvantages. Because phase measurement is circular, when the phase difference goes past $2\pi$ (or every wavelength of distance travelled by the light), the measurement resets at zero, this is known as phase wrap (or wraparound).

Wraparound limits the ability of the iToF system to detect the actual distance to an object with the single frequency scan. Because the phase difference resets each time it exceeds $2\pi$, search time the phase difference moves past $2\pi$, the distance measurement also resets. Therefore, the actual distance ($A_d$) to the object is unknown. In other words, the iToF system may report a plurality of distance estimates, where each estimate is separated from the succeeding estimate by a fixed distance corresponding to half the wavelength of the modulation of the light emitted by the light source. Mathematically, this plurality of distance estimates may be represented by a set of distances {d1, d1+$d_{amb}$, d1+2$d_{amb}$, d1+3$d_{amb}$, d1+4$d_{amb}$, ..., d1+n $d_{amb}$}, where $d_{amb}$ is called the ambiguity distance calculated as velocity of light over the twice the modulation frequency. The maximum distance measurable (i.e., corresponding to the maximum value of n) will be determined by the system sensitivity parameters such as the power of the light source, the optical train, the sensitivity of iToF sensor etc. The first estimate of the plurality of distance estimates (d1) may be the distance to the object that corresponds to the calculated phase difference between the emitted light and reflected light received at the iToF sensor. The first estimate (d1) that corresponds to the calculated phase difference is the minimum possible distance of the object. The fixed distance or ambiguity distance ($d_{amb}$) between successive elements is also known as the wraparound distance. The wraparound distance is determined based on the modulation frequency of the light signal that the iToF system emits. Therefore, different frequencies correspond to different wraparound distances.

For example, an emitted modulated signal having a frequency of 200 MHz may have a wraparound distance of 75 cm. Therefore the minimum possible distance of the object would be between 0 and 75 cm. From there, each distance estimate is determined by incrementing a prior distance estimate by the wraparound distance. For example, if the minimum possible distance estimate of the object is 25 cm, the plurality of distance estimates may be 25 cm, 100 cm, 175 cm, and so on. Thus, it is unclear whether the object is 25 cm away, 100 cm away, 175 cm away, and so on.

Conventionally, to detect and remove wraparound, multiple signals at different frequencies may be consecutively emitted from the iToF system. Because each emitted signal has a different modulation frequency, their corresponding reflected signals each have a different wraparound distance. Therefore, the iToF system may determine a set of distance estimates that each correspond to a different emitted signal. The values of the set of distance estimates from the different frequencies can be compared. The distance measured to the object is obtained by determining numerically whether at least two values in the different sets of distance estimates are the same or similar. However, determining multiple sets of distance measurements may require higher power consumption, longer processing time, and higher processing power. In addition, the computation may give inaccurate results or even fail completely if the object moves between the consecutive transmissions of different signals at different frequencies.

Embodiments of the present application disclose a method for determining a distance between a device and a target object by combining iToF and dToF measurements. Unlike prior embodiments, the measurements on the iToF and dToF sensors may be made concurrently (or almost concurrently). Advantageously this allows for a depth map to be generated with a high resolution using a single frequency scan.

Figure 1B:
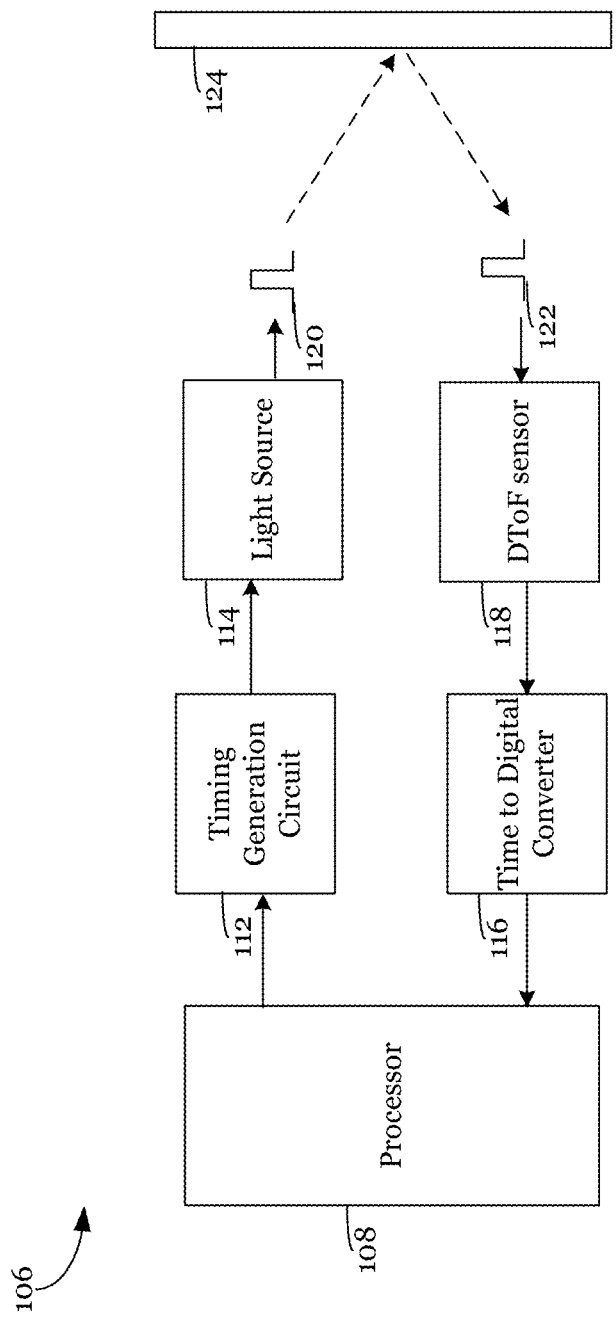
Figure 1C:
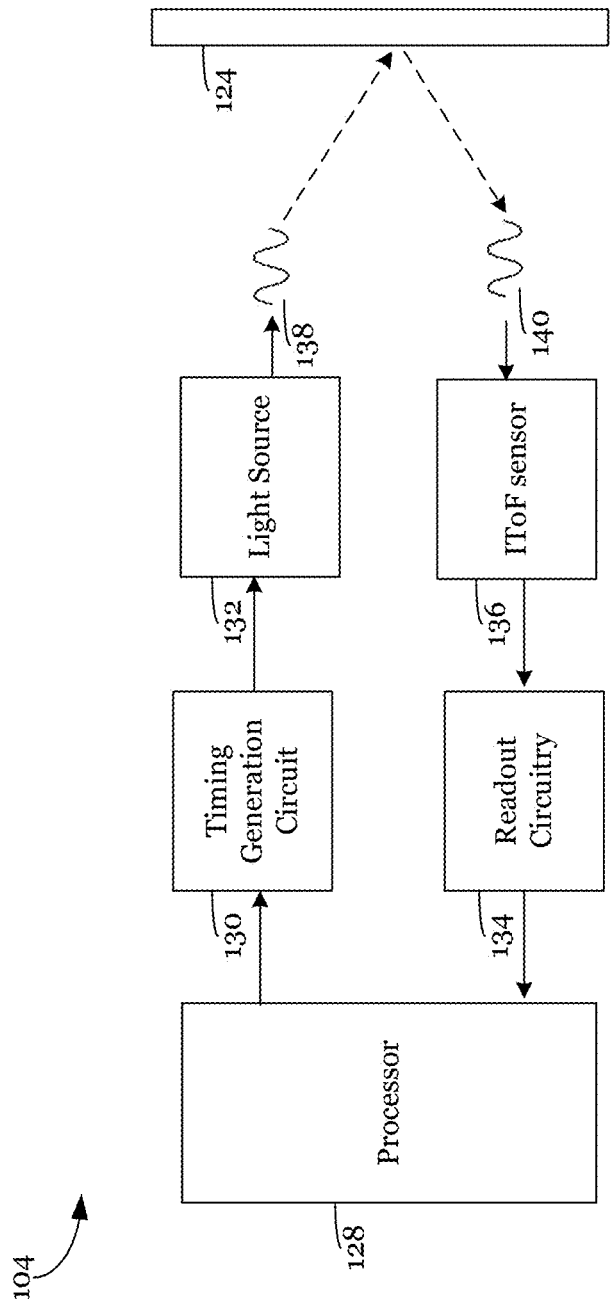
Figure 1D:
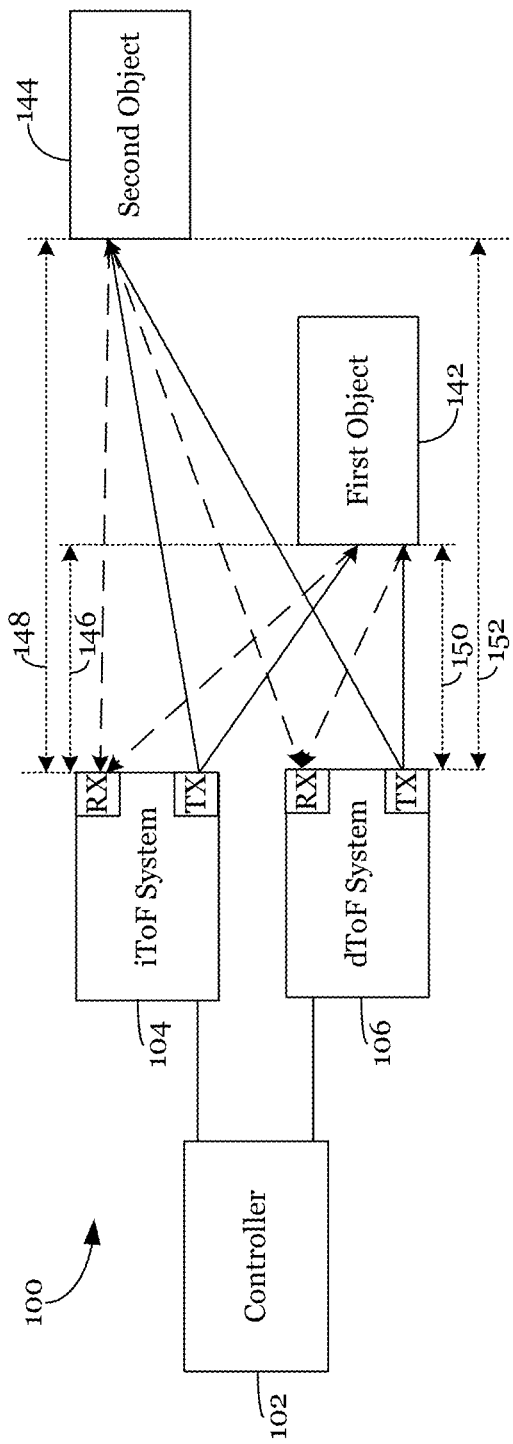

FIGS. 1A-1D illustrate schematic diagrams of a device according to an embodiment of the present application, where FIG. 1A illustrates a component schematic of the device, FIG. 1B illustrates a component schematic of a direct time of flight (dToF) system, FIG. 1C illustrates a component schematic of an indirect time of flight (iToF) system, and FIG. 1D illustrates the device measuring the distance between the device and two different target objects by combining dToF and iToF.

Referring to FIG. 1A, a device 100 may include a controller 102, an indirect time of flight (iToF) system 104, and a direct time of flight (dToF) system 106. The iToF system 104 may include an iToF sensor and the dToF system 106 may include a dToF sensor.

The controller 102 may comprise a processor, microprocessor, digital logic, ASIC, FPGA, or any other type of controller known in the art. The controller 102 may be one processor or a plurality of processors working together. The controller 102 may be configured to analyze information and carry out a series of executable scripts, e.g., stored in a memory 105. The memory 105 may be integrated in the controller 102 or may be separate. In various embodiments, the memory 105 may be programmed for short term as well as long term memory storage. The memory 105 may be configured to store data generated by the controller 102 and may comprise various programs to be executed in the controller 102. The memory 105 may include both volatile and non-volatile memories.

FIG. 1B illustrates a component schematic of the direct time of flight (dToF) system 106. Referring to FIG. 1B, a dToF system 106 includes a light source 114, a dToF sensor 118 comprising a single photodiode, one single photon avalanche diodes (SPAD) or an array of SPADs, a time to digital converter (TDC) 116, and a processor 108.

The processor 108 may be connected to a timing generation circuit 112 and the TDC 116 to respectively control the emission of a signal from the light source 114 and to collect data from the TDC 116 which the processor 108 can analyze. The processor 108 may be a microprocessor, a central processing unit (CPU) or any other type of processor known in the art. The processor 108 may be one processor or a plurality of processors working together.

During normal operation, upon receiving a signal from the timing generation circuit 112, the light source 114, may emit a light pulse 120 towards an object 124. The light source 114 may be a vertical cavity surface-emitting laser (VCSEL), a light emitting diode (LED), or the like.

The emitted light pulse 120 may reflect off the object 124 and the reflected light pulses 122 are received by the dToF sensor 118. The dToF sensor 118 may comprise one or more SPADs which form a one or more zones. The reflected light pulses 122 are reflected off the object 124 and are sensed by the one or more zones. The reflected light pulses 122 received by each zone are routed to the TDC 116. For example, besides other things like signal levels, the TDC 116 generates digital representations of the time that elapses between the emitting of the emitted light pulse 120 and when the reflected light pulses 122 are received by the one or more zones. The TDC 116 transmits the digital representations to the processor 108 which converts the digital representations into distance measurements. Based on the distance measurements, the processor 108 may generate a dToF depth map. Processor also generates ambient, amplitude data and histogram based on the information received from the dToF. The dToF map may include a signal rate, distance estimate between each zone and various objects (which may include object 124) in the frame of the dToF sensor 118. The ambient data corresponds to the ambient light in the FoV of each zone. The amplitude data corresponds to the light reflected by the object in each FoV at a distance. The processor 108 of the dToF system 106 may generate the dToF information, where the dToF information may include depth map, ambient data, amplitude data, and histogram and transmit the dToF information to the controller 102.

However, due to the limited spatial resolution of the dToF system 106, the distance estimates may comprise a possible range of distances between the multiple objects 124 within the zone.

FIG. 1C illustrates an iToF system 104. Referring to FIG. 1C, an iToF system 104 may include a light source 132, an iToF sensor 136, a timing generation circuit 130, readout circuitry 134, and a processor 128.

The processor 128 may be connected to the timing generation circuit 130 and the readout circuitry 134 to respectively control the emission of a signal from the light source 132 and collect data from the readout circuitry 134 which the processor 128 can analyze.

During operation, upon receiving a signal from the timing generation circuit 130, the light source 132 may emit a modulated signal 138 towards the object 124. The light source 132 may be an electromagnetic emitter such as a VCSEL device, a light emitting diode (LED), or the like. The modulated signal 138 may be a continuous wave signal such as a sine wave signal, a square wave signal, or a pulse wave signal (i.e., a pulse train). Unlike conventional iToF systems that use multiple scans with different frequencies, in various embodiments, the modulated signal 138 may be a light modulated at a single frequency in a single scan.

The modulated signal 138 may reflect off the object 124, forming modulated reflected signals 140 that are received by the iToF sensor 136. The iToF sensor 136 may be a camera that comprises an array of pixels configured to form an image. In one or more embodiments, the array of pixels may be formed by CMOS sensors comprising, e.g., photodiodes, SPAD or CCD devices. In other words, the pixels may be configured to receive the modulated reflected signals 140 and output data that can be used to determine a plurality of distance estimates between the iToF sensor 136 and the object 124.

The data collected by the iToF sensor 136 may be transmitted to the readout circuitry 134. The readout circuitry 134 may include an analog-to-digital converter (ADC), a digital signal processor (DSP), and/or a phase shift comparator. The readout circuitry 134 may convert the signals received by the iToF sensor 136 to digital data and determine ambient, amplitude, phase shifts (the phase differences) between the modulated reflected signals 140 and the emitted modulated signal 138, and transmit these to the processor 128. The processor 128 may then convert the phase shifts sensed by each pixel into a plurality of distance estimates, and may form an iToF depth map. The iToF depth map may include a plurality of distance estimates to the object 124 (and any other objects) in the frame of view of the iToF sensor 136. Data from the readout circuitry can be used by the processor to construct ambient and amplitude images corresponding to the ambient light and light reflected from the objects in the scene. The processor 128 of the iToF system 104 may generate the iToF depth map, ambient, amplitude data and transmit them to the controller 102.

Unlike the dToF depth map from the dToF system 106, as explained above, the iToF depth map does not include a specific distance at each pixel. Rather, each pixel has a plurality of distance estimates that are a function of the modulation frequency of the light used by the light source 132. As described above each distance estimate is incremented from a prior distance estimate by a fixed value equal to the wraparound distance. For example, if the minimum possible distance estimate to the object at a pixel is 25 cm and the wraparound distance is 75 cm, the distance estimates for the pixel may be 25 cm, 100 cm, 175 cm, and so on.

As described above, although the iToF system 104 allows for an iToF depth map with a higher spatial resolution, each pixel of the iToF sensor 136 provides multiple distance estimates to the object 124. Therefore, the actual distance between a pixel and the object 124 is unknown. Advantageously, embodiments of the present application disclose a device and method for combining dToF sensing and iToF sensing to detect the distance between the device 100 and an object 124 at the increased resolution provided by iToF sensing by performing only one frequency scan.

FIG. 1D illustrates an example of an implementation of the device 100 detecting the distances between the device 100 and two objects. Although FIG. 1D illustrates detecting the distance to two objects, this is for example purposes only.

Referring to FIG. 1D, the device 100 is detecting a distance between the device 100 and a first object 142 and a distance between the device 100 and a second object 144.

As described above, the device may include an iToF system 104 and a dToF system 106. The dToF system 106 may measure a first distance 150 between the dToF sensor 118 and the first object 142, and a third distance 152 between the dToF sensor 118 and the second object 144.

The iToF system 104 may determine a plurality of distance estimates corresponding to a second distance 146 between the iToF sensor 136 and the first object 142. The iToF system 104 may also determine a plurality of distance estimates corresponding to a fourth distance 148 between the iToF sensor 136 and the second object 144.

In the same manner described above, the first distance 150 may be determined by transmitting a light pulse from the dToF system 106, and then determining the delay between emitting the light pulse and receiving of the reflected signals returning from the first object 142. In addition, the dToF system 106 may determine the third distance 152 based on the delay between the emitting of the light pulse and receiving of the reflected signals returning from the second object 144. As understood by those with ordinary skill in the art, because the first object 142 and the second object 144 are different distances away from the dToF sensor 118, the time for reflected signals to return to the dToF sensor 118 after reflecting off each object will be different. In other words, the dToF sensor 118 will receive reflected signals at different times. Therefore, concurrently (or from a single pulse) the dToF system 106 may determine distances to multiple objects. For example, in this illustration, the reflected signals from the second object 144 will take longer to return to the dToF sensor 118 because the second object 144 is farther away from the dToF sensor 118.

The second distance 146 and the fourth distance 148 may be determined, e.g., by transmitting a modulated signal representing a waveform from the iToF system 104. Then, the plurality of distance estimates corresponding to the second distance 146 may be determined based on the phase difference between the reflected signals off the first object 142 and the emitted modulated signal. Also, a plurality of distance estimates corresponding to the fourth distance 148 may be determined based on the phase difference between the emitted modulated signal and reflected signals off the second object 144.

However, as described above, due to wraparound the actual second distance 146 and the actual fourth distance 148 are unknown.

FIG. 2 illustrates graphical representations for determining a distance between an indirect time of flight (iToF) sensor and two target objects.

Referring to FIG. 2, a first graph 200 illustrates the signal emitted from the iToF system 104, a second graph 202 illustrates the received reflected signal from the first object 142 at the iToF sensor 136, and a third graph 204 illustrates the received reflected signal from the second object 144 at the iToF sensor 136.

Referring to the second graph 202, the first object 142 is within the wraparound distance of the iToF sensor 136, and therefore, the minimum distance estimate determined by converting the phase difference $\Phi$ to a distance estimate is the actual distance to the first object 142. However, the processor 128 is unable to conclude that the minimum distance estimate accurately detects the distance to the first object 142 without transmitting modulated signals at different frequencies.

Referring to the third graph 204, the second object 144 is outside of the wraparound distance of the iToF sensor 136. Because periodic signals repeat (e.g., wrap) after each period, any signal with a phase shift by a whole wavelength is indistinguishable from the original. In other words, due to the periodicity of the return signal (the maximum phase difference of $2\pi$) once the phase shift reaches the maximum phase difference instead of continuing, it restarts at zero. Therefore, it cannot be determined which period/cycle of the waveform the reflected signal is phase shifted from. Therefore, wraparound prevents the controller 102 from knowing the actual second distance 146 and fourth distance 148.

Advantageously, to maintain the spatial resolution provided by iToF sensing, the field of view of the iToF sensor 136 and the dToF sensor 118 are aligned, and the data collected by both sensors can be used to determine the distances to both objects. One advantage of this is that each pixel in the iToF sensor 136 can be matched with corresponding dToF sensor 118 data. This allows for the controller 102 to determine distance(s) between the device 100 and object(s) with the increased spatial resolution provided by the iToF sensor 136 with single frequency scan.

Figure 3B:
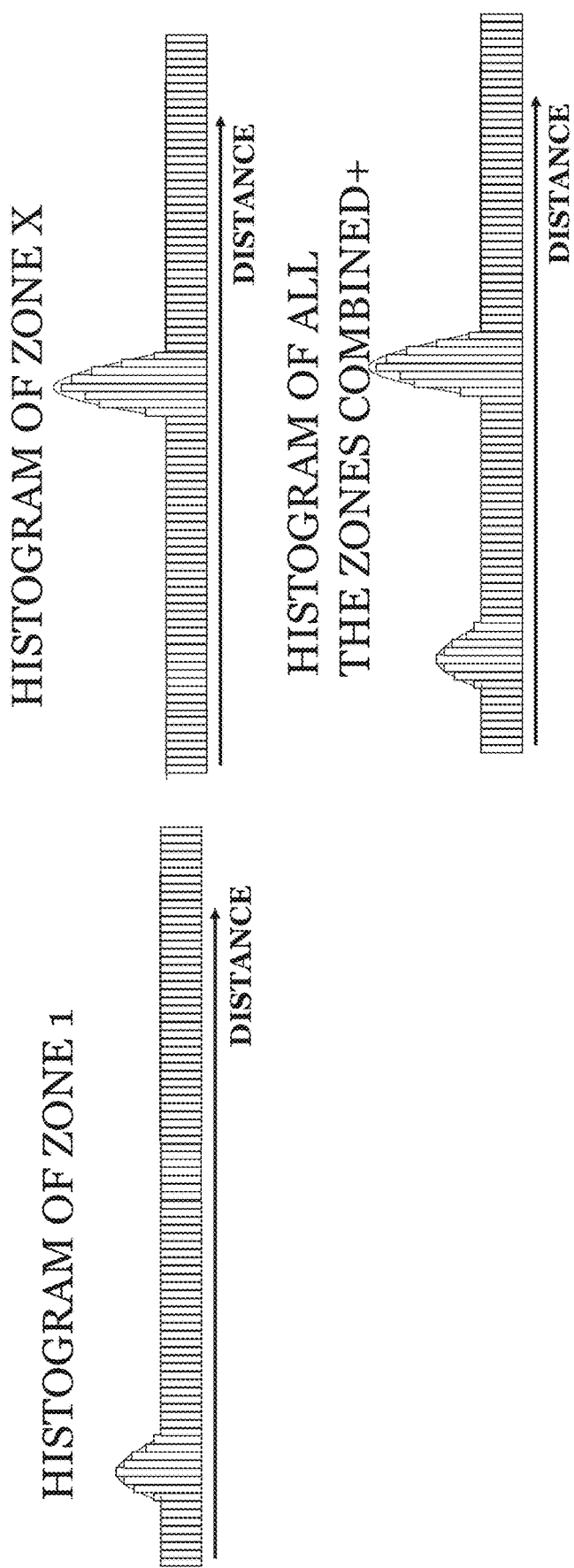
Figure 3H:
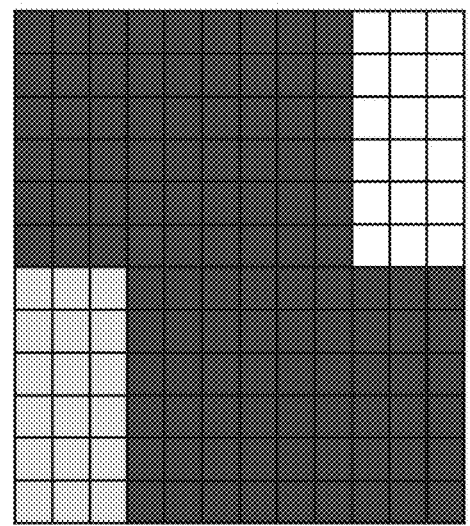
Figure 3D:
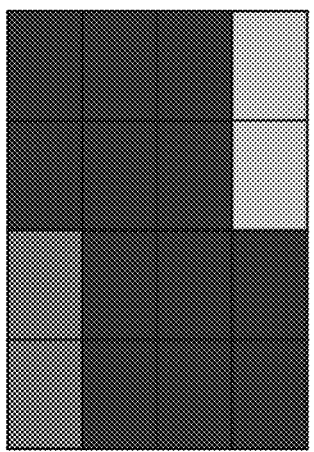
Figure 3G:
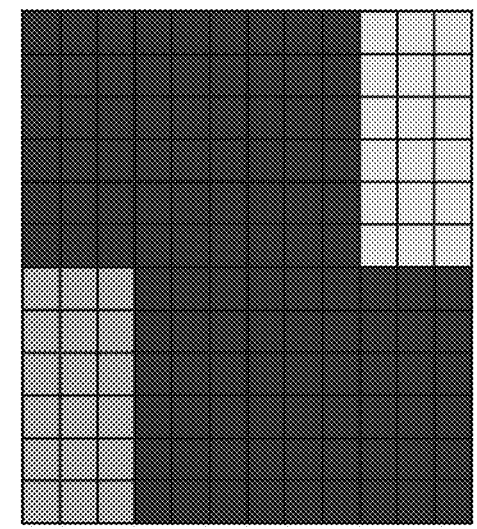
Figure 3C:
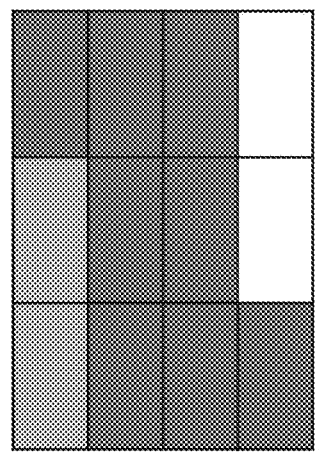
Figure 3F:
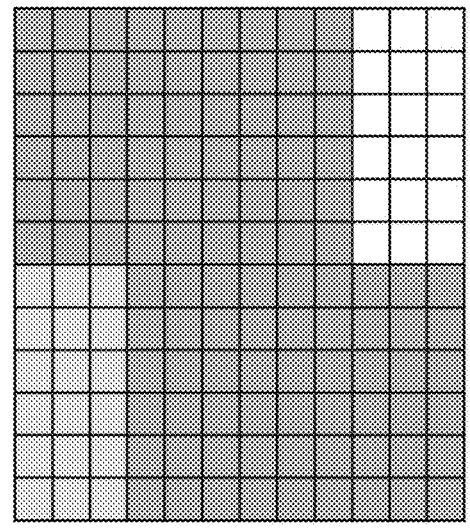

FIGS. 3A-3I illustrate schematic diagrams for combining the information from an indirect time of flight (iToF) sensor and a direct time of flight (dToF) to determine the distance between the device and the target objects, where FIG. 3A illustrates a dToF depth map, FIG. 3B illustrates histogram of the depth data from dToF sensor, FIG. 3C illustrates the ambient data from dToF sensor, FIG. 3D illustrates the amplitude data from the dToF sensor, FIG. 3E illustrates the iToF depth map, FIG. 3F illustrates ambient data from the iToF data, FIG. 3G illustrates the amplitude data from the iToF sensor, FIG. 3H illustrates the confidence map from the iToF, FIG. 3I illustrates a combined depth map generated by combining the dToF and the iToF information mentioned above.

Referring to FIG. 3A, a dToF depth map 302 may be generated by the dToF system 106. The dToF depth map 302 may include different sections corresponding to each zone 303 formed on the dToF sensor 118 For example, the dToF depth map 302 may be a 4×4 zone map of the frame of the dToF sensor 118. Although FIG. 3A shows a 4×4 dToF depth map 302 this is for example purposes only. The dToF sensor 118, and the dToF depth map 302 may include any suitable quantity of zones 303.

dToF depth map 302 may include zones 303 that receive reflected signals off the first object 142 and the second object 144. Each zone can also report multiple distances and ambient data from multiple targets. The location and distance to the first object 142 may be determined by the time delay between the emitted signal and which zones 303 of the dToF sensor 118 receive reflected signals off the first object 142. For example, as illustrated in the dToF depth map 302, two zones 303 sense the first object 142. In other words, the dToF depth map 302 may include a distance estimate for each zone 303 that receives reflected signals off the first object 142.

Similarly, two different zones 303 may detect the second object 144. In the same manner discussed above, the dToF depth map 302 may include distance estimates for each zone 303 on the dToF sensor 118 that receive reflected signals off the second object 144.

Referring to FIG. 3B, a histogram can be constructed for each zone 303 based on the signal reflected from the objects representing distance of single or multiple objects within the field of view of the zone. The histogram data can also provide information about the ambient level sensed by each zone 303 of the dToF sensor 118. Histogram data can also give information about the reflectance of the single or multiple objects in the field of view of each zone 303 of the dToF sensor 118.

Referring to FIG. 3C, an ambient map can be constructed based on the ambient signal sensed by each zone 303 of the dToF sensor 118. All the zones 303 in FIG. 3C represent the ambient signal in their field of view (FoV) including the light reflected by the first and second Object Referring to FIG. 3D, an amplitude map can be constructed based on the signal reflected from the single or multiple objects representing strength of the reflected signal sensed by each zone 303 of the dToF sensor 118 from each object. Each zone 303 can have single or multiple values representing reflectance of different objects in the field of view of the corresponding zone.

Referring to FIG. 3E, an iToF depth map 304 may also include distance of the first object 142 and the second object 144 sensed by the iToF sensor 136. As described above, the iToF depth map 304 may have a higher spatial resolution than the dToF depth map 302. In other words, the iToF depth map 304 may include a quantity of pixels 305 that outnumber the quantity of zones 303.

In a similar manner discussed above, the pixels 305 of the iToF sensor 136, may detect the first object 142 and the second object 144. In other words, a plurality of distance estimates between each pixel 305 and an object may be determined. As described above, the first possible distance of the plurality of distance estimates for each pixel 305 may be the minimum distance between a pixel 305 and a detected object. The remaining possible distance estimates may be determined by incrementing a prior distance estimate by the wraparound distance.

However, as described above, the actual distance of the object being detected by the pixels 305 are unknown.

Referring to FIG. 3F, an ambient image can be formed based on the ambient light that is sensed by each pixel 305 of the iToF sensor. This data can include the light reflected off the first object 142 and the second object 144.

Referring to FIG. 3G, an amplitude image can be formed at the iToF sensor based on the light reflected by single or multiple objects. Amplitude image represents strength of the light signal received by each pixel of the iToF sensor reflected off from the objects in the scene.

Advantageously, and as described above, various information determined from the dToF depth system 106 and the iToF system 104, may be compared and/or combined to determine the actual distance between the device 100 and both objects counteracting the tradeoff of each system.

FIG. 3I illustrates a combined depth map 306. The combined depth map 306 may be a combination of the information from dToF system 106 and the iToF system 104. In various embodiments, the dToF depth map 302, the dToF ambient map, the dToF amplitude map, and the iToF depth map 304, the iToF ambient map, the iToF amplitude, and respective histograms are compared to generate the combined depth map 306. The distances to an object may be determined by comparing respective overlapping zones 303 and pixels 305 in both depth maps. The overlapping zones 303 and pixels 305 are determined based on the field of view of each respective sensor. Because the field of view of each sensor is controllable and known, the overlapping portions of each depth map that are detecting the same object are known a priori. For example, based on the known field of view of both sensors, the zones 303 and the pixels 305 that respectively detect the first object 142 and the second object 144 are known.

In various embodiments, to combine depth maps, an overlapping zone 303 and pixel 305 may be compared. In various embodiments, information such as distance estimates, ambient, amplitude, histogram may be compared.

In an embodiment, the plurality of distance estimates between an object and the pixel 305 may be compared to the distance estimate between an overlapping zone 303 and the object. If one of the distance estimates of the pixel 305 overlaps the distance range of the overlapping zone 303, the distance estimate of the pixel 305 is used as the distance between the pixel 305 and the object in the combined depth map 306. A distance estimate for a pixel 305 in the iToF depth map 304 overlaps the distance range of an overlapping zone 303 if the distance estimate for the pixel 305 in the iToF depth map 304 is within the distance range of the overlapping zone 303.

For example, if the first object 142 is within the wraparound distance of the iToF sensor 136, the minimum distance between a pixel 305 and the first object 142 corresponds to the actual distance between the pixel 305 and the first object 142. Therefore, because the iToF depth map 304 provides an improved spatial resolution, the minimum distance estimate of pixel 305 is used in the combined depth map 306.

In some embodiments, at each pixel, the value, from amongst the possible distance values from the iToF sensor, is selected that is closest in distance to the distance estimate from the dToF sensor.

In determining the distance estimates from multiple objects, the amplitude, ambient and histogram data from the dToF system 106 can be compared with the amplitude and ambient data from the iToF system 104 to identify multiple objects within each zone. The amplitude data from the iToF system 104 can be compared to histogram data of the overlapping zone to identify single or multiple objects and its corresponding distances. An edge detection algorithm can be run on the amplitude and ambient data from the iToF system 104 to extract the boundaries of multiple objects resulting in an imaging mask. The imaging mask thus obtained along with the identified depths for different objects can be applied to the final depth image.

Figure 4:
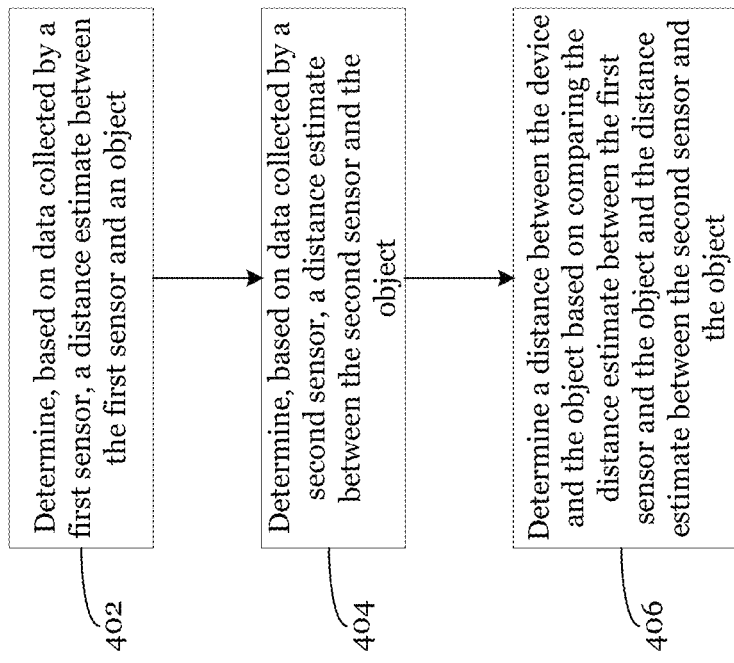
FIG. 4 illustrates a process flow for determining a distance between a device and a target object according to an embodiment of the present application.

FIG. 4 illustrates a process flow for determining the distance to an object according to an embodiment of the present application.

Referring to block 402 and described with reference to FIGS. 1A-1D and FIGS. 3A-3C, a distance estimate between a first sensor and an object may be determined. For example purposes only, the first sensor may be the direct time of flight (dToF) sensor 118 included in a dToF system 106 and the object may be the first object 142 or the second object 144. The distance estimate between the dToF sensor 118 and the object may be a range of distances determined in the same manner discussed in FIG. 1B.

Referring to block 404 and described with reference to FIGS. 1A-1D and FIGS. 3A-3C, a distance estimate between a second sensor and the object may be determined. For example purposes only, the second sensor may be an indirect time of flight (iToF) sensor 136 included in a iToF system 104 and the object may be the first object 142 or the second object 144 so long as the object is the same object detected by the first sensor. The distance estimate between the iToF sensor 136 and the object may be a plurality of potential distances between the object and the iToF sensor 136 determined in the same manner discussed in FIG. 1C.

Referring to block 406 and described with reference to FIGS. 1A-1D and FIGS. 3A-3C, a distance between the device 100 and the object may be determined based on comparing the distance estimate between the first sensor and the object and the distance estimate between the second sensor and the object. The distance between the device 100 and the object may be determined by generating a combined depth map 306 by combining information from dToF system and an iToF system, e.g., as described in FIGS. 3A-3I. In an embodiment, the information from the dToF system comprises depth map 302 and the information from the iToF system comprises depth map 304.

Figure 5:
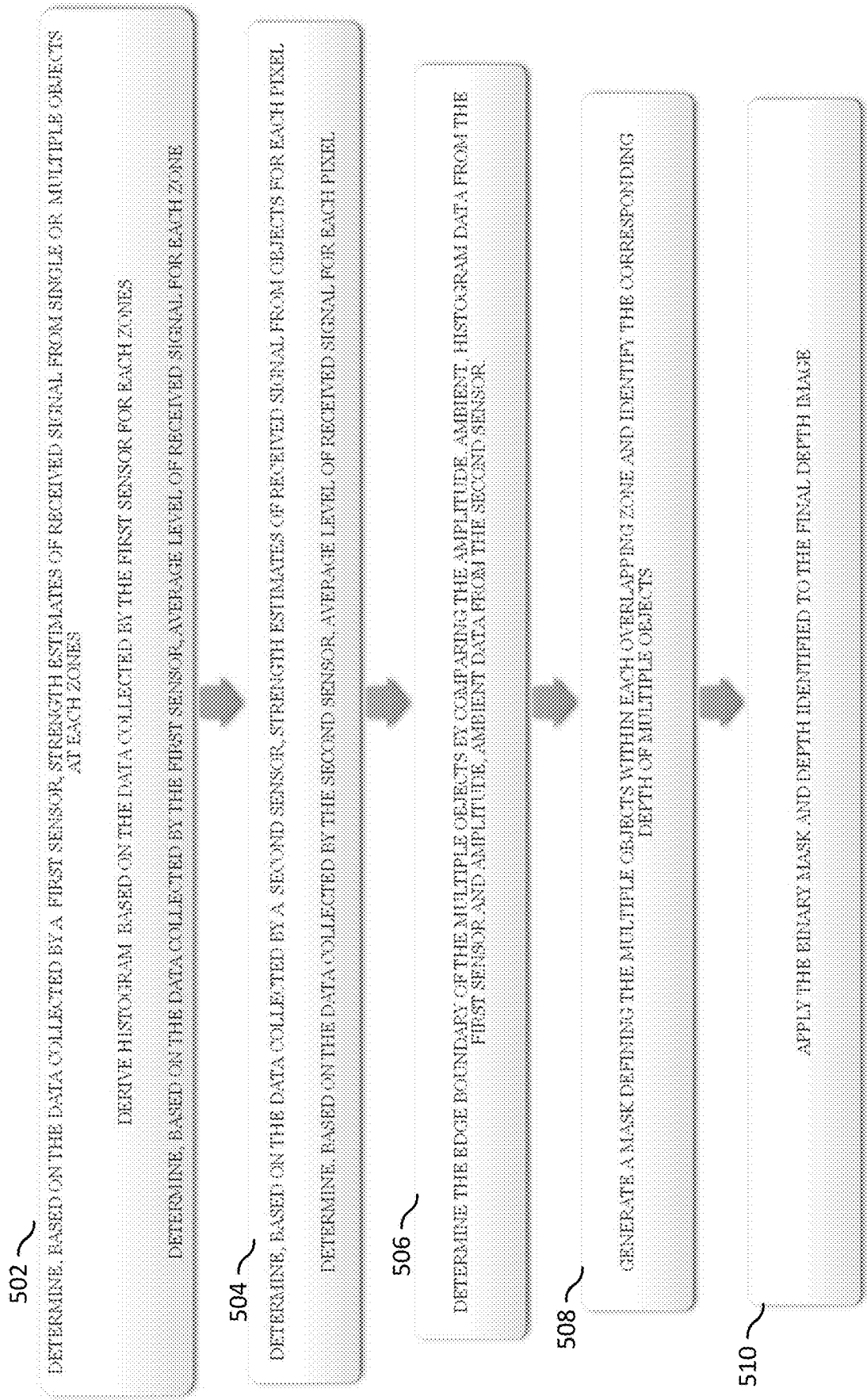
FIG. 5 illustrates a process flow for determining a distance between a device and a target object according to an embodiment of the present application.

FIG. 5 illustrates a process additional flow for determining the distance to an object according to an embodiment of the present application.

Referring to block 502 and described with reference to FIGS. 1A-1D and FIGS. 3A-3I, ambient and strength of the signal received between a first sensor and an object may be determined. For example purposes only, the first sensor may be the direct time of flight (dToF) sensor 118 included in a dToF system 106 and the object may be the first object 142 or the second object 144. The ambient estimate between the dToF sensor 118 and the object may be an average of the signal received by each zone of the dToF sensor. The amplitude estimate could be the strength of signal received from each object, e.g., this could be the data received by the dToF filtered through a high pass filter. A histogram can also be constructed based on the signal received per time sampling which can later be converted to the signal received by the dToF sensor from each distance.

Referring to block 504 to FIGS. 1A-1D and FIGS. 3A-3I, ambient and strength of signal received by each pixel of the second sensor may be determined. For example purposes only, the second sensor may be the indirect time of flight (iToF) sensor 136 included in an iToF system 104 and the object may be the first object 142 or the second object 144. The ambient estimate between the iToF sensor 118 and the object could be average of the signal received by the iToF sensor for full sampling period. The amplitude estimate could be the strength of signal received from each object in the field of view of the iToF sensor.

Referring to block 506, the ambient, amplitude, histogram data of the dToF system may be compared with ambient, amplitude data from the iToF system to determine the edges of the multiple objects. The signal strength thus obtained can be correlated between the data from the first sensor and second sensor. The edge identified can then be used to generate an image mask based on the amplitude image of the second sensor.

Referring to block 508, a mask is generated defining multiple objects in the field of view of overlapping zones between the first and second sensors and corresponding depth of each of the objects is identified. The signal strength received from each object to first and second sensors can be compared to the corresponding distances of the objects reflecting this light to establish the relationship between the distance and signal strength for each object.

Referring to block 510, the mask generated in the block 508 along with the distance and signal strength relationship can be used to apply the correct distance to generate the final depth map.

Example embodiments of the invention are summarized here. Other embodiments can also be understood from the entirety of the specification as well as the claims filed herein.

Example 1. A method for operating a device includes determining, based on data collected by a first sensor, first information between the first sensor and an object; determining, based on data collected by a second sensor, second information between the second sensor and the object; and determining a distance between the device and the object based on comparing the first information and the second information.

Example 2. The method of example 1, where the first information includes a distance estimate and the second information includes a distance estimate.

Example 3. The method of one of examples 1 or 2, where the first information includes an ambient light information received at the first sensor, amplitude of light received at the first sensor, or histogram of depth information, and the second information includes an ambient light information received at the second sensor or amplitude of light information received at the second sensor.

Example 4. The method of one of examples 1 to 3, where the first information includes an ambient light information received at the first sensor, amplitude of light received at the first sensor, and histogram of depth information, and the second information includes an ambient light information received at the second sensor and amplitude of light information received at the second sensor.

Example 5. The method of one of examples 1 to 4, where determining the first information includes: determining based on the data collected by the first sensor, a strength estimate of received signal at each zone of the first sensor; deriving a histogram based on the data collected by the first sensor for each zone of the first sensor; and determining based on the data collected by the first sensor an average level of received signal for each zone of the first sensor.

Example 6. The method of one of examples 1 to 5, where determining the second information includes: determining, based on the data collected by the second sensor, a strength estimate of received signal for each pixel of the second sensor, the second sensor including a plurality of pixels; and determining, based on the data collected by the second sensor, an average level of received signal for each pixel of the plurality of pixels.

Example 7. The method of one of examples 1 to 6, where the first information includes amplitude, ambient, histogram data from the first sensor and the second information includes amplitude, ambient data from the second sensor, and where determining the distance between the device and the object includes determining an edge boundary of a plurality of objects detected in a field of view of the second sensor by comparing the amplitude, ambient, histogram data from the first sensor with the amplitude, ambient data from the second sensor.

Example 8. The method of one of examples 1 to 7, further including generating a mask defining the plurality of objects within each overlapping zone of the first and second sensors and identifying a corresponding depth of each of the plurality of objects.

Example 9. The method of one of examples 1 to 8, further including applying a mask and depth identified to a depth image.

Example 10. The method of one of examples 1 to 9, where the second sensor has a greater spatial resolution than the first sensor.

Example 11. The method of one of examples 1 to 10, where the first sensor is a direct time of flight (dToF) and the second sensor is an indirect time of flight (iToF) sensor.

Example 12. The method of one of examples 1 to 11, where the first information or the second information includes a distance estimate.

Example 13. The method of one of examples 1 to 12, where the first sensor includes a single photon avalanche diode (SPAD), where the second sensor includes a photo-sensitive device.

Example 14. A device includes a first sensor attached to the device; a second sensor attached to the device; a controller; and a non-transitory memory storing a program to be executed in the controller, the program including instructions when executed cause the controller to: determine, based on data collected by a first sensor, a first information for a field of view of the first sensor, determine, based on data collected by a second sensor, a second information for a field of view of the second sensor, and determine a distance between the device and a plurality of objects based on comparing the first information with the second information.

Example 15. The device of example 14, where the first information includes a distance estimate and the second information includes a distance estimate.

Example 16. The device of one of examples 14 or 15, where the first information includes an ambient light information received at the first sensor, amplitude of light received at the first sensor, or histogram of depth information, and the second information includes an ambient light information received at the second sensor or amplitude of light information received at the second sensor.

Example 17. The device of one of examples 14 to 16, where the instructions to determine the first information includes instructions to: determine based on the data collected by the first sensor, a strength estimate of received signal at each zone of the first sensor, derive a histogram based on the data collected by the first sensor for each zone of the first sensor, and determine based on the data collected by the first sensor an average level of received signal for each zone of the first sensor; where the instructions to determine the second information includes instructions to: determine, based on the data collected by the second sensor, a strength estimate of received signal for each pixel of the second sensor, the second sensor including a plurality of pixels; and determine, based on the data collected by the second sensor, an average level of received signal for each pixel of the plurality of pixels.

Example 18. The device of one of examples 14 to 17, where the first information includes amplitude, ambient, histogram data from the first sensor and the second information includes amplitude, ambient data from the second sensor, and where determining the distance between the device and the object includes determining an edge boundary of a plurality of objects detected in a field of view of the second sensor by comparing the amplitude, ambient, histogram data from the first sensor with the amplitude, ambient data from the second sensor.

Example 19. The device of one of examples 14 to 18, where the program includes further instructions when executed cause the controller to generate a mask defining the plurality of objects within each overlapping zone of the first and second sensors and identifying a corresponding depth of each of the plurality of objects and apply the mask and the depth identified to a depth image.

Example 20. The device of one of examples 14 to 19, where the second sensor has a greater spatial resolution than the first sensor, and where the first sensor is a direct time of flight (dToF) and the second sensor is an indirect time of flight (iToF) sensor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for time of flight sensing using a device, the method comprising:
   emitting a light pulse towards an object;
   determining, based on data collected by a first sensor, first information between the first sensor and the object, wherein the first information comprises amplitude, ambient, histogram data from the first sensor;
   emitting a modulated signal towards the object;
   determining, based on data collected by a second sensor, second information between the second sensor and the object, wherein the second information comprises amplitude, ambient data from the second sensor; and
   determining a distance between the device and the object based on comparing the first information and the second information, wherein determining the distance between the device and the object comprises determining an edge boundary of a plurality of objects detected in a field of view of the second sensor by comparing the amplitude, ambient, histogram data from the first sensor with the amplitude, ambient data from the second sensor.

2. The method of claim 1, wherein the first information further comprises a distance estimate and the second information comprises a distance estimate.

3. The method of claim 1, wherein determining the first information comprises:
   determining, based on the data collected by the first sensor, a strength estimate of received signal at each zone of the first sensor;
   deriving a histogram based on the data collected by the first sensor for each zone of the first sensor; and
   determining based on the data collected by the first sensor an average level of received signal for each zone of the first sensor.

4. The method of claim 1, wherein determining the second information comprises:
   determining, based on the data collected by the second sensor, a strength estimate of received signal for each pixel of the second sensor, the second sensor comprising a plurality of pixels; and
   determining, based on the data collected by the second sensor, an average level of received signal for each pixel of the plurality of pixels.

5. The method of claim 1, further comprising generating a mask defining the plurality of objects within each overlapping zone of the first and second sensors and identifying a corresponding depth of each of the plurality of objects.

6. The method of claim 5, further comprising applying the mask and the depth identified to a depth image.

7. The method of claim 1, wherein the second sensor has a greater spatial resolution than the first sensor.

8. The method of claim 1, wherein the first sensor is a direct time of flight (dToF) and the second sensor is an indirect time of flight (iToF) sensor.

9. The method of claim 8, wherein the first information or the second information comprises a distance estimate.

10. The method of claim 1, wherein the first sensor comprises a single photon avalanche diode (SPAD), wherein the second sensor comprises a photosensitive device.

11. A device for time of flight sensing, the device comprising:
- a first sensor attached to the device;
- a first light source coupled with the first sensor;
- a second sensor attached to the device;
- a second light source coupled with the first sensor;
- a controller; and
- a non-transitory memory storing a program to be executed in the controller, the program comprising instructions when executed cause the controller to:
  - emit a first light pulse from the first light source,
  - determine, based on data collected by the first sensor, a first information for a field of view of the first sensor, wherein the first information comprises amplitude, ambient, histogram data from the first sensor,
  - emit a modulated signal from the second light source,
  - determine, based on data collected by the second sensor, a second information for a field of view of the second sensor, wherein the second information comprises amplitude, ambient data from the second sensor, and
  - determine a distance between the device and a plurality of objects based on comparing the first information with the second information, wherein determining the distance between the device and the plurality of objects comprises determining an edge boundary of the plurality of objects detected in the field of view of the second sensor by comparing the amplitude, ambient, histogram data from the first sensor with the amplitude, ambient data from the second sensor.

12. The device of claim 11, wherein the first information further comprises a distance estimate and the second information comprises a distance estimate.

13. The device of claim 11,
wherein the instructions to determine the first information comprise instructions to:
- determine, based on the data collected by the first sensor, a strength estimate of received signal at each zone of the first sensor,
- derive a histogram based on the data collected by the first sensor for each zone of the first sensor, and
- determine, based on the data collected by the first sensor, an average level of received signal for each zone of the first sensor;

wherein the instructions to determine the second information comprises instructions to:
- determine, based on the data collected by the second sensor, a strength estimate of received signal for each pixel of the second sensor, the second sensor comprising a plurality of pixels; and
- determine, based on the data collected by the second sensor, an average level of received signal for each pixel of the plurality of pixels.

14. The device of claim 11, wherein the program comprises further instructions when executed cause the controller to: generate a mask defining the plurality of objects within each overlapping zone of the first and second sensors and identifying a corresponding depth of each of the plurality of objects, and apply the mask and the depth identified to a depth image.

15. The device of claim 11, wherein the second sensor has a greater spatial resolution than the first sensor, and wherein the first sensor is a direct time of flight (dToF) and the second sensor is an indirect time of flight (iToF) sensor.

16. A method for time of flight sensing using a device, the method comprising:
- emitting a light pulse towards an object;
- determining, based on first data collected by a first sensor, first information between the first sensor and the object;
- emitting a modulated signal towards the object;
- collecting second data with a second sensor, the second data being generated using a modulated reflected signal from the object;
- determining, based on the second data, second information between the second sensor and the object;
- determining a distance between the device and the object based on comparing the first information and the second information; and
- generating a mask defining a plurality of objects within each overlapping zone of the first and second sensors and identifying a corresponding depth of each of the plurality of objects.

17. The method of claim 16, further comprising using the mask with the distance to generate a final depth map.

18. The method of claim 16, wherein the data collected by the first sensor is generated using a reflected light pulse from the object.

19. The method of claim 16, wherein the modulated signal is a continuous wave signal.

20. The method of claim 16, wherein the modulated signal is a pulse train.

* * * * *